United States Patent
Berhanu et al.

(10) Patent No.: US 8,234,195 B1
(45) Date of Patent: Jul. 31, 2012

(54) GENERATING AND DISTRIBUTING A FINANCIAL QUIZ USING A PERSONAL FINANCIAL MANAGEMENT APPLICATION AND A SOCIAL NETWORK SERVICE

(75) Inventors: Aaron Elias Berhanu, San Francisco, CA (US); Ashli Louise Pfeiffer, Wayzata, MN (US); Ellen Chen Shen, San Bruno, CA (US); Maya Kathryn Wilton, Moraga, CA (US)

(73) Assignee: Intuit Inc., Mountain View, CA (US)

( * ) Notice: Subject to any disclaimer, the term of this patent is extended or adjusted under 35 U.S.C. 154(b) by 261 days.

(21) Appl. No.: 12/717,106

(22) Filed: Mar. 3, 2010

(51) Int. Cl.
*G06Q 40/00* (2006.01)
(52) U.S. Cl. ........................................... 705/35
(58) Field of Classification Search ............... 705/35
See application file for complete search history.

(56) References Cited

U.S. PATENT DOCUMENTS

| | | | |
|---|---|---|---|
| 2003/0078793 A1* | 4/2003 | Toth | 705/1 |
| 2008/0243586 A1* | 10/2008 | Dohring et al. | 705/10 |
| 2009/0106136 A1* | 4/2009 | Wright | 705/35 |
| 2010/0042511 A1* | 2/2010 | Sundaresan et al. | 705/26 |
| 2011/0153387 A1* | 6/2011 | Ma | 705/7.32 |

OTHER PUBLICATIONS

Facebook.com, "Friend Quiz," http://www.facebook.com/search/?q=friend+quiz&init=quick#/apps/application.php?id=8600404576&ref=search&sid=207525.1172984172..1, Aug. 21, 2009, 1 page.
Facebook.com, "H&R Block Financial Match Quiz," http://www.facebook.com/search/?q=financial+quiz&init=quick#/apps/application.php?id=20218269600&ref=search&sid=207525.268381128..1, Aug. 21, 2009, 1 page.
Facebook.com, "What's Your Financial Profile?," http://www.facebook.com/search/?q=financial+quiz&init=quick#/apps/application.php?id=73796889639&ref=search&sid=207525.268381128..1, Aug. 21, 2009, 1 page.

* cited by examiner

*Primary Examiner* — Lindsay M. Maguire
(74) *Attorney, Agent, or Firm* — Osha • Liang LLP (57) ABSTRACT

A method for distributing a quiz on a social network service, including: extracting, from a personal financial management application (PFMA), a spending history of a user of the PFMA, where the spending history includes a plurality of categories defined in the PFMA and a plurality of transactions performed by the user; selecting a category of the plurality of categories; selecting a question from a plurality of questions based on the category; generating an answer to the question based on the plurality of transactions within the category; adding, to the quiz describing a financial behavior of the user, the question and a plurality of response choices including the answer to the question; and distributing the quiz to a plurality of contacts of the user in the social network service.

25 Claims, 5 Drawing Sheets

My Quiz 405

410 — 1. My typical Friday afternoon is spent at:
- a.) Lunch with friends
- b.) Happy Hour
- c.) Shopping \*\*from transactional data by time and date\*\*

415 — 2. Am I a…
- a.) Master Chef
- b.) Dining extraordinaire
- c.) Queen (King) of Fast Food \*\*from transactional data categorized into Groceries and Dining\*\*

420 — 3. What is my favorite campus coffee shop? (Can expand this question to restaurants, pizza places, bar, ice cream shop, essentially any category)
- a.) Student Run Coffee Shop
- b.) Mass Market Coffee Chain
- c.) Premium Cafe
- d.) Yuck, I don't drink coffee!

\*\*from transactional data on payees\*\*

425 — 4. The bar that's most likely to recognize me when I walk in the door:
- a.) Neighbourhood Bar
- b.) Upscale Lounge
- c.) An Irish Pub
- d.) I spend my Friday nights at the library \*\*from transactional data via payees\*\*

430 — 5. At 3am I crave:
- a.) Mexican Fast Food
- b.) Cookies
- c.) Healthy Snacks
- d.) Pizza
- e.) Sleep.

\*\*from transactional data via payees and time\*\*

435 — 6. Which salon is responsible for my stylish do?
- a.) High End Salon
- b.) Personal Stylist
- c.) College Barber Shop
- d.) None, I look this good on my own.

\*\*from transactional data via payee\*\*

440 — 7. My wardrobe could be straight out of a ______ catalog:
- a.) Urban Retailer
- b.) Mid-Scale Retailer
- c.) Tailored Apparel
- d.) Upscale Retailer \*\*from transactional data via payee\*\*

445 — 8. I'm most likely to do the following with my discretionary budget:
- a.) Blow it @ Upscale Retailer.
- b.) Save it!
- c.) Hit the nightclubs!

\*\*from transactional data categorized into Savings, Entertainment, and Clothing\*\*

450 — 9. I'm more likely to shop for groceries…
- a.) …on a budget at general grocery store.
- b.) …for organic only at upscale grocery store.
- c.) I dine out basically all the time.

\*\*from transactional data categorized into Groceries and Dining\*\*

GENERATING AND DISTRIBUTING A FINANCIAL QUIZ USING A PERSONAL FINANCIAL MANAGEMENT APPLICATION AND A SOCIAL NETWORK SERVICE

BACKGROUND

Financial management applications allow users to monitor their personal finances, such as credit cards, bank accounts, lines of credit, loans, mortgages, assets, liabilities, and other financially related accounts and transactions. Businesses that sell financial management applications typically use traditional advertising avenues including television, print, and radio to increase the business's customer base. Additionally, these businesses are using the Internet as a marketing channel.

An application on the Internet that has recently grown in popularity is the social network. Social networks allow individuals to connect with others through a mapping of relationships, whether they are representations of personal friendships, business relationships, common interests, or other relationships. Social networks thus consist of groups of contacts connected through a relationship network.

SUMMARY

In general, in one aspect, the invention relates to a method for distributing a quiz on a social network service. The method comprises: extracting, from a personal financial management application (PFMA) executing on a processor, a spending history of a user of the PFMA, wherein the spending history comprises a plurality of categories defined in the PFMA and a plurality of transactions performed by the user; selecting a category of the plurality of categories; selecting a question from a plurality of questions based on the category; generating, using the processor, an answer to the question based on the plurality of transactions within the category; adding, to the quiz describing a financial behavior of the user, the question and a plurality of response choices comprising the answer to the question; and distributing the quiz to a plurality of contacts of the user in the social network service.

In general, in one aspect, the invention relates to a system for distributing a quiz on a social network service. The system comprises: a processor; a personal financial management application (PFMA) executing on the processor and comprising: an application programming interface (API) that allows access to the PFMA; and a financial data repository storing a plurality of transactions performed by a user; a question repository storing a plurality of questions; a financial quiz application configured to: extract, from the PFMA using the API, a spending history of the user of the PFMA, wherein the spending history comprises a plurality of categories defined in the PFMA and the plurality of transactions; select a category of the plurality of categories; select a question from the plurality of questions based on the category; generate an answer to the question based on the plurality of transactions within the category; add, to the quiz describing a financial behavior of the user, the question and a plurality of response choices comprising the answer to the question; and distribute the quiz to a plurality of contacts of the user in the social network service.

In general, in one aspect, the invention relates to a computer readable medium storing instruction to distribute a quiz on a social network service. The instructions comprise functionality to: extract, from a personal financial management application (PFMA), a spending history of a user of the PFMA, wherein the spending history comprises a plurality of categories defined in the PFMA and a plurality of transactions performed by the user; select a category of the plurality of categories; select a question from a plurality of questions based on the category; generate an answer to the question based on the plurality of transactions within the category; add, to the quiz describing a financial behavior of the user, the question and a plurality of response choices comprising the answer to the question; and distribute the quiz to a plurality of contacts of the user in the social network service.

Other aspects of the invention will be apparent from the following description and the appended claims.

BRIEF DESCRIPTION OF DRAWINGS

FIGS. 3 and 4 show examples in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for distributing a quiz on a social network. Specifically, the quiz is created from transactions recorded in a personal financial management application (PFMA) that detail the spending history of the user. Accordingly, the quiz includes questions regarding the financial behavior of the user. The quiz may be distributed to the contacts of the user.

Figure 1:
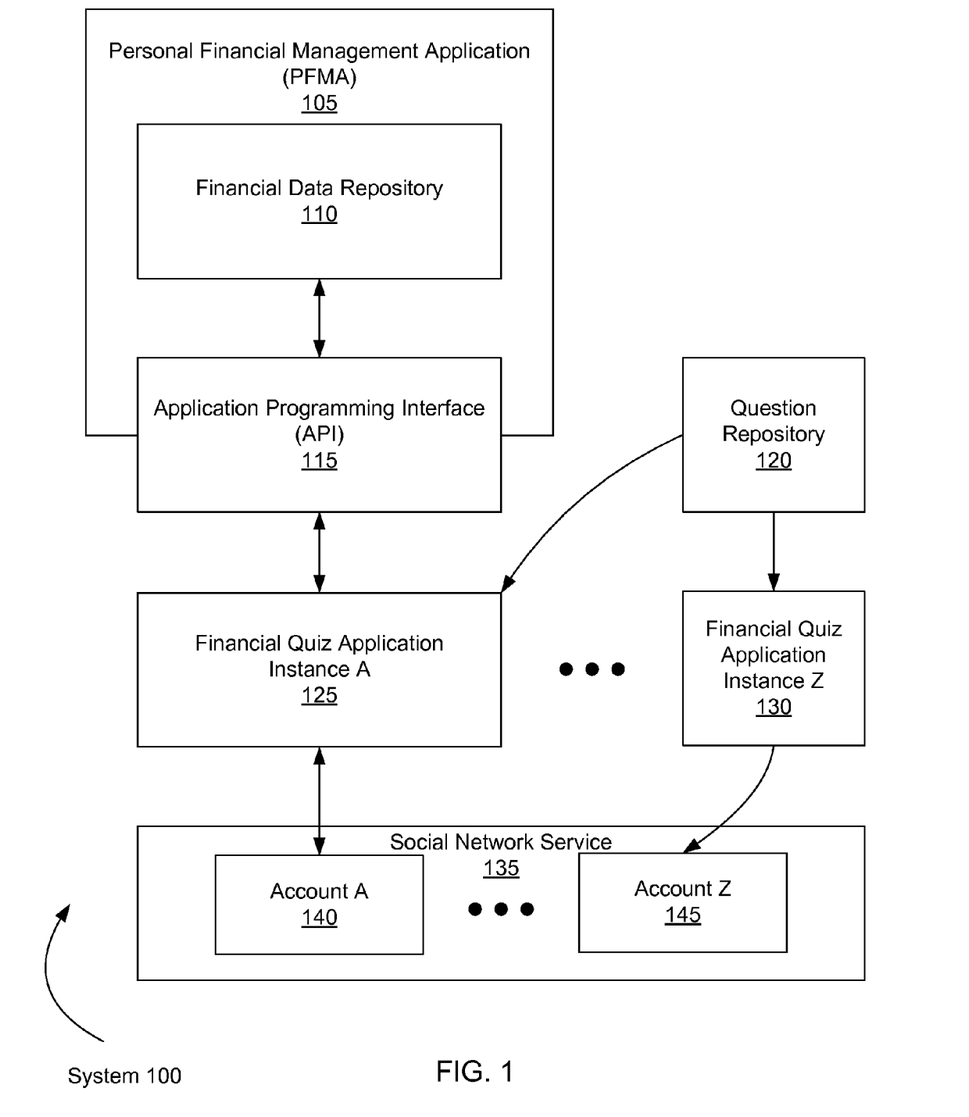
FIG. 1 shows a system in accordance with one or more embodiments of the invention.

FIG. 1 shows a system (100) in accordance with one or more embodiments of the invention. As shown in FIG. 1, the system (100) includes a personal financial management application (PFMA) (105), a question repository (120), multiple instances of a financial quiz application (e.g. financial quiz application instance A (125) to financial quiz application instance Z (130)), and a social network service (135) containing multiple accounts (e.g. account A (140) to account Z (145)). Each of these components is described below.

In one or more embodiments of the invention, the PFMA (105) is a software application that allows a user to manage his/her finances. For example, the PFMA (105) may be a software application such as Quicken®, Mint.com®, FinanceWorks®, or other software capable of assisting a user to mange his/her finances. Quicken®, Mint.com®, and FinanceWorks® are registered trademarks of Intuit, Inc., located in Mountain View, Calif. The PFMA (105) may include functionality to manage various financial data associated with the user (e.g. a person or a business entity). Specifically, the financial data describes the spending history of the user. The spending history may correspond to purchases/expenditure made by the user at various types of vendors (e.g. restaurants, travel agencies, clothing retailers, bookstores, and other businesses) and/or donations made by the user to various charitable or non-profit organizations.

In one or more embodiments of the invention, each expenditure or donation is recorded as a transaction within the PFMA. A transaction includes financial data corresponding to the expenditure or donation. For example, the financial data (e.g. meta-data) may include a charge amount (e.g. a dollar amount for the transaction), a transaction timestamp (e.g. Jan. 10, 2009, 2:30 pm), a vendor (e.g. a recipient of the charge such as "store A"), a location of the vendor (e.g. an address in San Francisco, Calif.), a vendor ID (e.g. an alphanumeric string), and other transaction information (e.g. the product sold or service rendered by the vendor to the user for the charge amount).

In one or more embodiments of the invention, the PFMA (105) includes functionality to monitor and categorize transactions. Multiple transactions may be categorized according to a charge amount, a donation amount, a type of vendor, a geographical location of the vendor, a vendor ID, a type of good or service, etc. For example, consider categorizing a set of transactions according to the type of retailer (i.e. vendor) involved in the transaction. As a result, each transaction may be grouped into one of restaurant, salon, bookstore, travel agency, clothing store, and other types of vendors. Transactions may also be categorized according to other metrics (e.g. location, time range, timestamp, date range, season, charge amount, retailer name, retailer identity, frequency of occurrence, and any other data type associated with a transaction). Other ways of categorizing transactions may be used without departing from the scope of the invention.

Continuing with FIG. 1, in one or more embodiments of the invention, the PFMA (105) includes a financial data repository (110) and an application programming interface (API) (115). The financial data repository (110) is any type of storage unit and/or device (e.g. a file system, database, collection of tables, or any other storage mechanism) for storing data. Further, the financial data repository (110) may include multiple different storage units and/or devices. The multiple different storage units and/or devices may or may not be of the same type or located at the same physical site. The financial data repository (110) may be locally or remotely accessed by the PFMA. In one or more embodiments of the invention, the financial data repository includes functionality to store the financial data for the PFMA (105).

In one or more embodiments of the invention, the application programming interface (API) (115) is an application that allows the PFMA to transfer financial data to other applications and allows other applications to access the financial data within the PFMA in a manner determined by the PFMA. In other words, the financial data that may be accessed within the PFMA by an outside application, and the manner in which this access may occur, is controlled by the API. Therefore, the API acts as a control mechanism for access to data within the PFMA. In one or more embodiments of the invention, the API may allow an outside application to request specific financial data from the PFMA, in a specific format, and with the application of data filters.

Continuing with FIG. 1, in one or more embodiments of the invention, question repository (120) is any type of storage unit and/or device (e.g. a file system, database, collection of tables, or any other storage mechanism) for storing data. Further, the question repository (120) may include multiple different storage units and/or devices. The multiple different storage units and/or devices may or may not be of the same type or located at the same physical site. The question repository (120) may be locally or remotely accessed by the PFMA. The question repository is configured to store questions that are pertinent to the financial data of PFMA (105).

The questions may be pre-defined by the PFMA (105) and populated in the question repository (e.g. by the API (115)). Questions within the question repository (120) may pertain to categories within the PFMA (105). For example, a question may focus on a specific time and vendor type. The corresponding answer(s) to the question may contain vendor names associated with transactions that have been categorized according to time. By way of a more concrete example, a set of transactions may be categorized by the PFMA according to a "time range" (e.g. 2:00 AM to 3:00 AM) and "food". The transactions corresponding to both categories may be related to food purchased by the user between 2:00 AM and 3:00 AM. These transactions contain meta-data describing the name of the restaurant or store selling food (e.g. vendor name). When this set of transactions has been determined, the PFMA may generate and populate the question repository with questions pertaining to food between 2:00 AM and 3:00 AM. For instance, the question may be "Between 2:00 AM and 3:00 AM, I usually eat at which restaurant?".

Once forwarded to the question repository (120), each question may remain in question repository (120) until it is proactively deleted. In such a scenario, as more quizzes are generated (discussed below), a larger set of pre-determined questions may be defined within the question repository (120). This mechanism may allow the questions repository (120) to, over time, create a set of questions that are increasingly precise to specific transaction categories as well as increasingly broad across categories. Other mechanisms may be used to populate questions in the question repository, such as a one time population, population over different time intervals, and/or population by third-parties.

Continuing with FIG. 1, in one or more embodiments of the invention, a financial quiz application includes multiple application instances (e.g. financial quiz application instance A (125) to financial quiz application instance Z (130)). Each financial quiz application instance includes functionality to create and distribute quizzes to contacts of a user in a social network service (discussed below). The terms "financial quiz application" and "financial quiz application instance" may be used interchangeably throughout the detailed description.

In one or more embodiments of the invention, the financial quiz application includes functionality to interact with core features of the social network service (described below) through an application programming interface of the social network service. The financial quiz application may distribute content to, request input from, and otherwise interact with users in the social network service. In order to add the financial quiz application instance to a user's account within the social network service, it may be necessary for the user to select the financial quiz application, give permission for the financial quiz application to access the user's financial data at the PFMA (105), and/or perform other actions. The financial quiz application instance may require credentials (e.g. username and password) of the user for user authentication and authorization.

A financial quiz application may communicate with the PFMA (105) through the API (115). Specifically, the financial quiz application may include functionality to access financial data in the financial data repository (110) through the API (115). The financial quiz application may also include functionality to interface with the question repository (120) and retrieve questions from the question repository. Once the financial quiz application has retrieved the financial data and the questions, the financial quiz application may generate response choices to the questions and populate a financial quiz (also known as the quiz). In other words, the quiz may be populated with questions and response choices pertaining to the spending history of the user who added the financial quiz application to his/her account in the social network service (e.g. social network service (135)), and who is a registered user of the PFMA. In one or more embodiments of the invention, the quiz may describe the financial behavior of a user across multiple dimensions (e.g. across multiple categories).

Each financial quiz application instance is a distribution of the financial quiz application. For example, each financial quiz application instance may be a separate copy of the financial quiz application for the user. Alternatively, as another example, the financial quiz application may allow for multiple connections to the same single executing application (e.g. through multi-threading or other techniques). In such an example, the financial quiz application instance may correspond to a connection to the single executing application. In one or more embodiments of the invention, each financial quiz application instance has its own associated access rights. For example, if two users (e.g. user A and user B) that are friends on a social network service have both added the financial quiz application, then the two users may have two instances of the financial quiz application. If one of the users (e.g. user A) is a registered user of the PFMA, and the other user (e.g. user B) is not a registered user of the PFMA, the users A and B may have different access rights in the financial quiz application. For example, user A may have the ability to access the question repository and user A's personal data (e.g. spending history, transactions) through the financial quiz application, while user B may not have access to the question repository or the PFMA (until user B registers with the PFMA). As another example, user A may have the ability to create quizzes based on his/her own financial data in the PFMA, and distribute those quizzes to his/her contacts in the social network service through the financial quiz application. In contrast, user B might not have the ability to create or distribute quizzes but may receive and complete quizzes distributed by user A. Once user B completes a quiz (e.g. prepared and distributed by user A), and registers with the PFMA, then the access rights of user B may be modified such that user B has the ability to create quizzes and distribute them through the social network service.

In one or more embodiments of the invention, the financial quiz application includes functionality to display information associated with the user of the PFMA and the social network service. Information displayed by the financial quiz application may be viewed in a web browser, an application window, or by other similar means. The financial quiz application may include standard web elements including video, audio, and text. The financial quiz application may also include various interface technologies such as radio buttons, checkboxes, text fields on forms, voice capture, and user gesture interpretation. Various other display technologies and elements used by and to view the financial quiz application (e.g. financial quiz application instance A (125)) may be used without departing from the scope of the invention.

Further, the financial quiz application may include a locally installed portion and a server portion (e.g. peer to peer system, centralized system). The locally installed portion may include the full functionality of the social network service (discussed below) (e.g. include an interface and all of the contact information). Alternatively, the locally installed portion may only include functionality to obtain data from the local computer to populate the remote servers. Alternatively, both the PFMA and the financial quiz application may be remote applications from the user. In such a scenario, the user may simply access the financial quiz application via a web browser.

Continuing with FIG. 1, the social network service (135) may correspond to an online service or software application that includes functionality to enable registered users of the social network service to form social networks with other registered users of the social network service based on relationships (e.g. as friends, business partners, individuals with shared interests, individuals with common goals, and other types of relationships). Specifically, a social network is an interconnection of users. The social network service (135) includes functionality to create and manage the social network of users. In one or more embodiments of the invention, the social network service (135) includes multiple accounts (e.g. account A (140) to account Z (145)). Each account is registered to a user of the social network service (135). In one or more embodiments of the invention, each account (e.g. account A (140) to account Z (145)) is associated with unique credentials (e.g. username and password). The account of a user may be linked to an account of other users as contacts within the social network service (135). This link may provide the users (i.e., members) of a single contact network (i.e. a network of contacts) with access to information on the pages of other members. In contrast, users who are not members of the single contract network might not have access to the mention information. Accordingly, the contact network may be considered a sub-network of the social network service (135).

In one or more embodiments of the invention, users of the PFMA (105) may form contact networks with contacts within the social network service (135) and distribute quizzes to their contacts. When a user with a registered account adds an instance of the financial quiz application (e.g. financial quiz application instance A (125), financial quiz application instance B (130)), the user views the financial quiz application in the visual representation of his/her account (e.g. account A (140) to account Z (145)) in the social network service (i.e. his/her "page" in the social network service). In one or more embodiments of the invention, only one instance of the financial quiz application is tied to a single account, and only one account is associated with a single instance of a financial quiz application. This paradigm maintains security and data integrity in the social network service because the content and actions taken within a single financial quiz application instance are controlled by the user of the financial quiz application instance. Alternatively, multiple instances of the financial quiz application may be tied to a single account.

As discussed above, users of a social network service may add financial quiz applications to their account. In one or more embodiments of the invention, by adding the financial quiz application to an account, the user of the account is consenting to the distribution of content by the financial quiz application and/or interaction with the financial quiz application. Specifically, once a user of the PFMA (105) and the social network service (135) adds the financial quiz application (e.g. financial quiz application instance A (125)) in the social network service, this integrates the financial quiz application into the account of the user (e.g. account A (140)), and allows the user to provide and receive content through the financial quiz application.

Components shown in FIG. 1 may be located on the same device (e.g. a server, mainframe, desktop Personal Computer (PC), laptop, Personal Digital Assistant (PDA), telephone, mobile phone, kiosk, cable box, and any other hardware device) or may be located on separate devices connected by a network (e.g. the Internet), with wired and/or wireless segments. There may be more than one personal financial management application, question repository, and financial quiz application executing on a device, as well as more than one social network service and account interfacing with those components.

Figure 2:
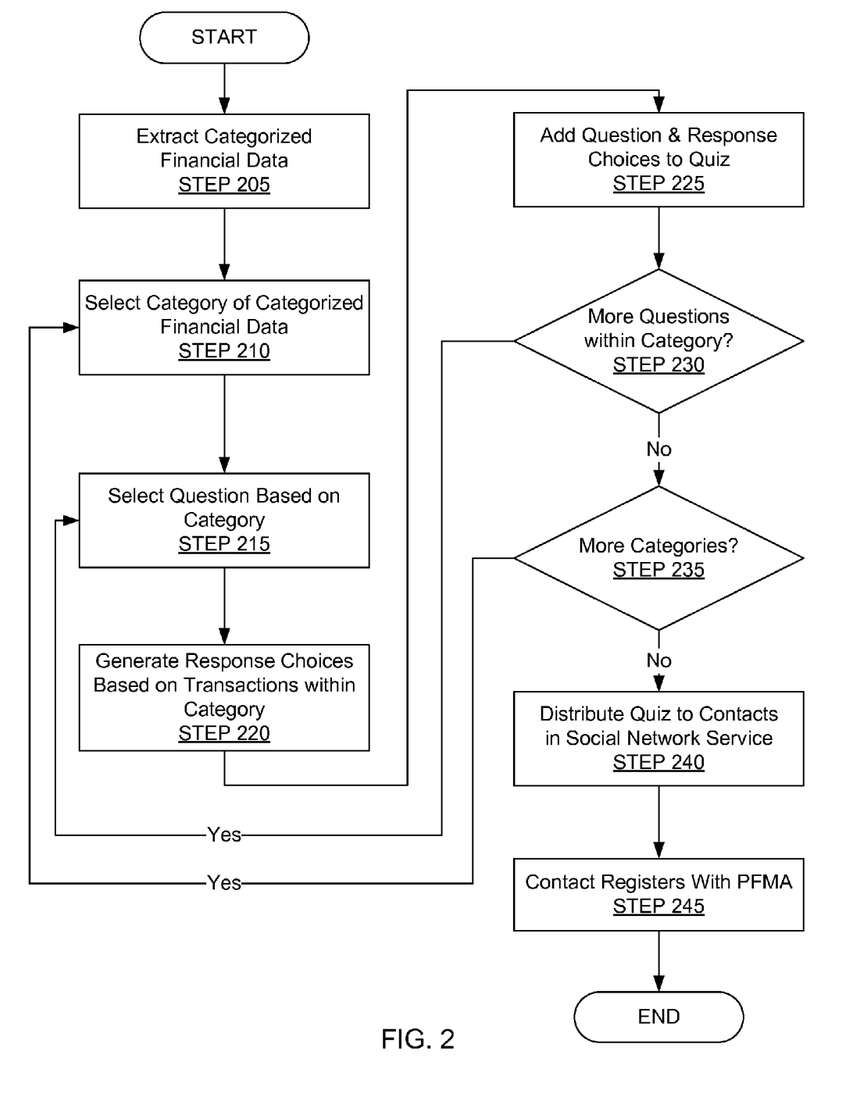
FIG. 2 shows a flowchart in accordance with one or more embodiments of the invention.

FIG. 2 shows a flowchart in accordance with one or more embodiments of the invention. The process shown in FIG. 2 may be used, for example, with system (100), to distribute a quiz on a social network service (e.g., social network service (135)). While the various steps in this flowchart are presented and described sequentially, some or all of the steps may be executed in different orders, may be combined or omitted, and some or all of the steps may be executed in parallel.

In STEP 205, categorized financial data is extracted. For example, the financial quiz application, executing on a processor, may request via the API that the PFMA categorize and extract the financial data from the financial data repository. As another example, the financial quiz application may request that the PFMA, via the API, provide financial data about transactions having a specific category of characteristics. Alternatively, in one or more embodiments of the invention, the financial quiz application may access the financial data repository directly to extract financial data. The financial data may be categorized into groups according to various types of information (e.g. date, time, transaction amount, vendor name, vendor ID, vendor type, location, and other categories).

In one or more embodiments of the invention, the PFMA provides financial data that is categorized at more than one level. In other words, the categorized financial data may include a number of data sets, and these data sets may be associated with each other (i.e. categorized, or filtered at a greater granularity). For example, if the financial data is categorized according to vendor type (e.g. restaurant, apparel store, bookstore), each group of categorized financial data (e.g. transactions associated with restaurants, apparel stores, or bookstores) may also be associated with other groups. This association may provide for multiple levels of categorization. Specifically, the group containing transactions for restaurants may be associated to the group containing transactions for apparel stores by the categorization of transaction amount. In this case, the result set may include transactions that are associated with either restaurants or apparel stores that have a transaction amount above a specified transaction amount. The result set of categorized financial data might, for instance, include those transactions that were either made at restaurants or apparel stores for more than $100. Extending this concept, any categorization of financial data that can be represented as a Boolean expression (e.g. A & B|C) may be provided and implemented by the PFMA.

In STEP 210, the category of the categorized financial data is selected. This category may be selected by the financial quiz application (e.g. financial quiz application instance A (125)). The selection of a category may be based upon numerous factors, including a number of transactions associated with a specific category, an aggregate dollar amount of the transactions associated with a specific category, dates and/or timestamps of the transactions associated with a specific category, and so on. For example, one way of selecting a category from a group of categories is to select the category having the most transactions. As discussed before, categories may be based on various types of information (e.g. date, time, transaction amount, vendor name, vendor ID, vendor type, location). The selection of the category may be performed by the financial quiz application, with or without input from the user that executed the transactions.

In STEP 215, a question is selected based on the category. The question may be selected by the financial quiz application (e.g. financial quiz application instance A (125)) from the question repository (e.g. question repository (120)). As discussed above, in one or more embodiments of the invention, questions in the question repository are pre-associated with categories. Thus, the categories may be used to access questions in the question repository. The question may be chosen from a set of potential questions, and the set of potential questions may be generated by filtering the set of questions in the question repository based on the category. The selection may be performed by the financial quiz application based on input from the user associated with the transactions. For example, the user may be provided with a set of potential question choices, and may select one question to be used from the set of potential questions. The potential question may also be selected by the financial quiz application, without the intervention of the user, in a random fashion or based on pertinent information in the spending history of the user.

For example, if the category is restaurants (i.e. a vendor type), a question selected from the question repository may be "what is my favorite restaurant?". Similarly, if the category is a time range (e.g. 8:00 PM to 11:00 PM), then the associated question selected from the question repository may be "How do I spend money between the times of 8:00 PM and 11:00 PM?". Various mechanisms may be used to populate the question repository with questions related to categories.

In one or more embodiments of the invention, after a question is selected, a search attribute may be identified. The search attribute may identify a subset of the set of transactions associated with the category. For example, the search attribute may identify all transactions that occur at a certain time of day, or may be associated with a specific vendor. After applying this search (e.g. filter), the set/number of transactions both associated with the category and available for use in generating responses may be reduced.

In STEP 220, response choices are generated based on the transactions within the category. The financial quiz application, executing on a processor, may generate the response choices using transactions obtained from the financial data repository of the PFMA. In one or more embodiments of the invention, generating the response choices includes generating an answer to the question by querying the transaction data. For example, if the category is restaurants, and the question is "what is my favorite restaurant?", then the transactions within the category (i.e. those associated with vendors that are restaurants) may be queried to determine the most frequently visited restaurant. False response choices may be generated by including less frequently visited restaurants and/or restaurants that the user has not visited, but are in the user's vicinity. By way of an example, if the transactions within this category are sorted according to most frequently visited (e.g. greatest number of transactions associated with a specific vendor name), and the top four most visited vendor names include "restaurant A" (e.g. the most visited), "restaurant B" (e.g. the second most visited), "restaurant C" (e.g. the third most visited), and "restaurant D" (e.g. the fourth most visited), then the response choices generated may be 1) "restaurant A", 2) "restaurant B", 3) "restaurant C", and 4) "restaurant D". In the example, because "restaurant A" is the most visited restaurant, "restaurant A" is designated as the correct answer.

In STEP 225, the question and response choices are added to a quiz. Initially, the response choices may be presented in any order. In one or more embodiments of the invention, as one or more users take the quiz, the ordering of the response choices within the quiz may be determined based on the answer that occurred most recently, the answer that occurred most frequently, the answer that occurred for the longest duration, and so on. Alternatively, the order may be completely random. This determination, as well as the determination of how the question and answers are presented on the quiz (i.e. formatted, arranged) may be made by the user that performed the transactions upon which the answers are based, using the financial quiz application. For example, during the quiz creation process, the financial quiz application may ask the user to determine how the question and answers may be presented on the quiz. The financial quiz application may also add the question and generated answers to the quiz without the intervention of the user. In the example above, the following set of question/response choice data may be appended (e.g. added) to the quiz (i.e. the quiz may be generated using the following data): What is my favorite restaurant?: 1) "restaurant A" 2) "restaurant B" 3) "restaurant C" 4) "restaurant D".

In STEP 230, it is determined whether there are more questions with the category. When it is determined that questions within the category still remain, the process returns to STEP 215. When it is determined that no questions within the category still remain, the process proceeds to STEP 235. This portion of the quiz generation allows for multiple iterations through the financial data, and allows the quiz to be constructed to the desired depth.

In STEP 235, it is determined whether additional categories exist. Specifically, the process determines whether there are more categories associated with questions that have not yet been added to the quiz. When it is determined additional categories exist, the process returns to STEP 210. When it is determined that no additional categories exist, the process proceeds to STEP 240. This portion of the quiz generation also allows for multiple iterations through the financial data, and allows the quiz to be constructed to the desired breadth.

In STEP 240, the quiz is distributed to contacts in the social network service. The quiz may be distributed by the financial quiz application. In one or more embodiments of the invention, the user designates which contacts can access the quiz. Distributing the quiz to the contacts may be performed by posting the quiz to the account of the contacts. For example, if a user (e.g. user A) is registered with the PFMA and holds an account in the social network service, and other users (e.g. users B to Z) hold accounts in the social network service and are connected to user A through the social network service (and may or may not be registered as users of the PFMA), then users B to Z would be considered contacts of user A in the social network service. The distribution of the quiz to users B to Z by user A transfers the content of the quiz to the financial quiz applications of users B to Z. Distributing the quiz may include inviting users B to Z to take (i.e. complete, fill out) the quiz and return their completed quiz to user A. Distributing the quiz may also include inviting the contacts to register with the PFMA and create a quiz of their own, which they may then also distribute to their contacts in the social network service. In this way, registration of users in the social network service with the PFMA may accelerate exponentially, as network effects may drive new users to use the PFMA.

In STEP 245, a contact registers with the PFMA. For example, if a contact of user A (e.g. user B, a friend of user A in the social network service) is not a registered user of the PFMA, then once user B receives the quiz that user A distributed through the social network service, user B may choose to complete the quiz and/or register as a user of the PFMA. There are many mechanisms by which user B may initiate registration with the PFMA, such as an html link in the distributed quiz directing user B to the website of the PFMA, a checkbox in the quiz providing consent for the financial quiz application to forward information regarding registration with the PFMA in an email or other communication medium (e.g. social network service email, wall post, short messaging service (SMS) message, tweet, instant message (IM)) to user B, a text box in the quiz allowing user B to enter his/her email or other communication information (e.g. mobile phone number) to receive further registration information, and the like.

Registration by user B with the PFMA may enable user B to generate quizzes based on his/her own financial data once user B has enough financial data (e.g. transactions) generated/recorded in the PFMA. For example, if user B completes user A's quiz and registers with the PFMA, transactions executed by user B may begin to be stored/recorded within the PFMA. As the financial data of user B stored in the PFMA grows in quantity over time, the PFMA, the financial quiz application, and user B may be able to generate quizzes that are increasingly accurate, precise, and quantifying of user B's spending history.

As an alternative to the process shown in FIG. 2, in one or more embodiments of the invention, the financial quiz application may categorize the financial data on its own, after receiving it from the PFMA. Further, a question may be selected before selection of the category. For example, a question may be selected, search strings may be determined based on the question, the search strings may be submitted to the PFMA through the API, which may generate answers based on transactions and provide these answers to the financial quiz application for use in generating the quiz. Other alternative processes may be used to generate the quiz without departing from the scope of the invention.

Figure 3:
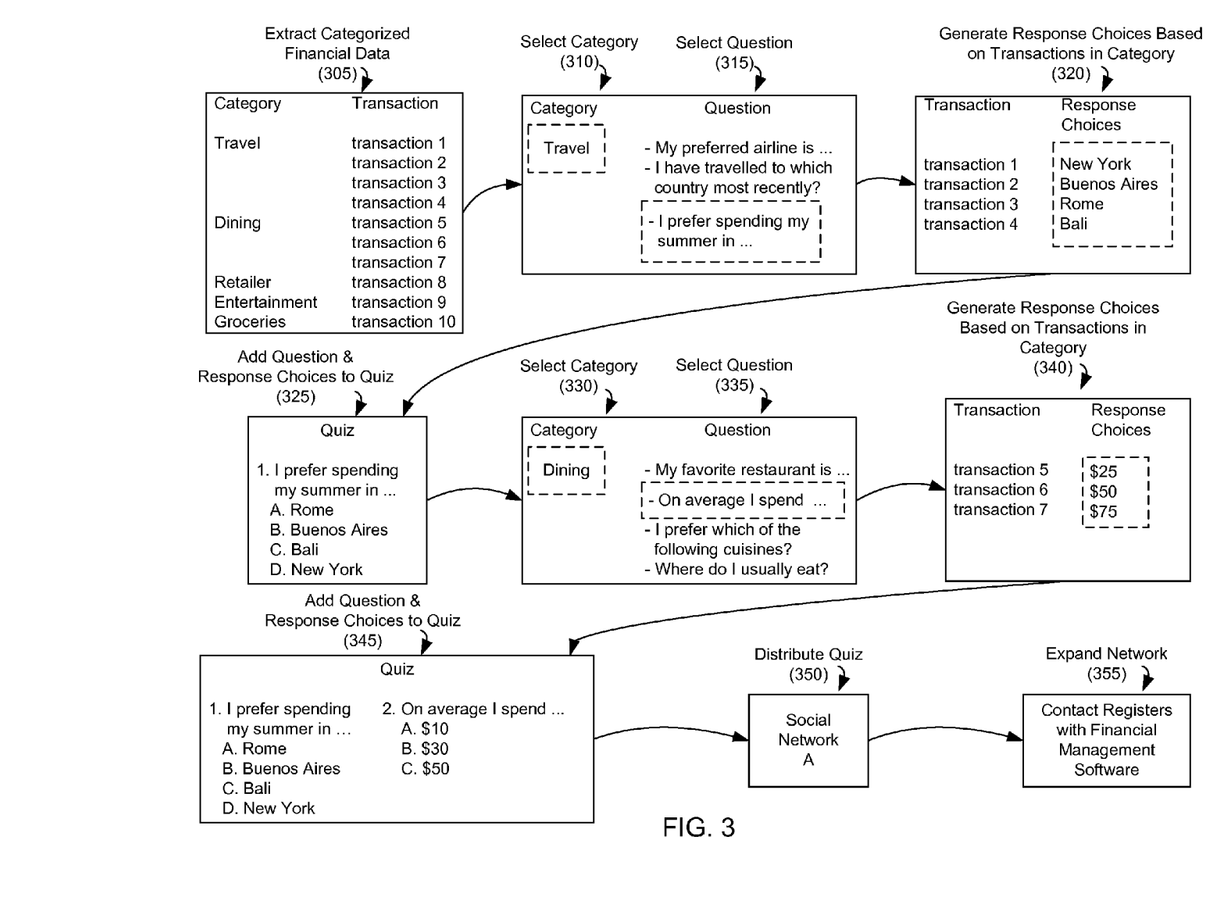

FIG. 3 shows an example in accordance with one or more embodiments of the invention. The example shown in FIG. 3 is an example only and not intended to limit the scope of the invention.

Initially, categorized financial data is extracted (305) from the PFMA. Specifically, the financial data is extracted from the financial data repository in the PFMA by the financial quiz application using the API. As shown in FIG. 3, 10 transactions are extracted under selected categories (e.g. travel, dining, retailer, entertainment, groceries) as part of the financial data. Transactions 1-4 may be grouped under a "travel" category, transactions 5-7 may be grouped under a "dining" category, transaction 8 may be grouped under a "retailer" category, transaction 9 may be grouped under an "entertainment" category, and transaction 10 may be grouped under a "groceries" category. These categories are merely representative. Many other category types under which transactions may be grouped may be used without departing from the scope of the invention.

Next, a category from the multiple categories is selected (310). As shown in FIG. 3, the "travel" category is selected. This selection may be performed by the financial quiz application, and may be based on input received from a user that performed the transactions grouped under the selected category. As discussed above, the selection of a category may be based upon numerous factors, including a number of transactions associated with a specific category, an aggregate dollar amount of the transactions associated with a specific category, dates and/or timestamps of the transactions associated with a specific category, and so on. For example, one way of selecting a category of the present categories is to select the category that has the most transactions grouped under it. In the example cited above, the "travel" category has the most transactions associated with it of the present categories, thus it is chosen. Other ways to select a category may be used without departing from the scope of the invention.

A question is then selected (315). The question may be chosen from a set of potential questions, and the set of potential questions may be generated by filtering the set of questions in the question repository based on the category. For example, once the "travel" category has been chosen, the complete set of questions in the question repository are filtered to produce a filtered set of questions relating to travel. Specifically, these filtered questions may include "My preferred airline is . . . ", "I have travelled to which country most recently?", and "I prefer spending my summer in . . . ". In FIG. 3, the question "I prefer spending my summer in . . . " is selected. This selection may be performed by the financial quiz application based on input from the user associated with the transactions. For instance, the user may be provided with a set of potential question choices, and may select one question to be used from the set of potential questions. The potential question may also be selected by the financial quiz application without the intervention of the user in a random fashion or based on pertinent information in the spending history of the user. For example, if the user travels exclusively in the summertime, then the financial quiz application may use this information to select a question related to the summer season.

Response choices, based on the transactions in the category, are generated (320). As shown in FIG. 3, the response choices include "New York" generated from transaction 1, "Buenos Aires" generated from transaction 2, "Rome" generated from transaction 3, and "Bali" generated from transaction 4. Transactions 1-4 may be associated with trips made during the summer season (e.g. tickets booked by a user with a travel agent to New York, Buenos Aires, Rome, and Bali at different dates, but all during the summer season). The financial quiz application may perform the parsing and subsequent identification of "matching" transactions. For instance, there may be other transactions associated with the travel category, however not all of them may be transactions associated with travel made during the summertime. If only transactions 1-4 are associated with tickets purchased for travel during the summer season, then they may be the only transactions used to generate answers. Similarly, if other transactions were also associated with travel during the summertime, then these other transactions may also be used to generate the response choices. Other mechanisms to generate the response choices may be used without departing from the scope of the invention.

Continuing with the example, the question and response choices are then added to the quiz (325). As shown in FIG. 3, the question "I prefer spending my summer in . . . " and the response choices: A. "Rome", B. "Buenos Aires", C. "Bali", and D. "New York" are added to the quiz. There may be one correct answer to the question in this set of response choices.

Next, another category (e.g. a second category) is selected (330). As shown in FIG. 3, the second category selected is "dining". This step may be viewed as a second iteration of the step described above in 310 (i.e. the selection of the "travel" category). This selection may again be performed by the financial quiz application, and may be based on input received from the user that performed the transactions grouped under the "dining" category. In the example, the "dining" category is selected because the transactions within the "dining" category sum to the greatest aggregate dollar amount.

Another question (e.g. a second question) is then selected (335) in the example. As shown in FIG. 3, the filtered set of questions may include "My favorite restaurant is . . . ", "On average I spend . . . ", "I prefer which of the following cuisines?", and "Where do I usually eat?". As shown in FIG. 3, the question "On average I spend . . . " is selected. As described above, the selection may be performed by the financial quiz application based on input from the user associated with the transactions, or may be selected by the financial quiz application without the intervention of the user. For example, if the user predominantly spends money within a certain range of dollar amounts for dinner at restaurants, then the financial quiz application may use this information to select a question related to average dinner costs.

Another set of response choices (e.g. a second set of response choices) based on the transactions in the second category are then generated (340). As shown in FIG. 3, preliminary response choices may include "$25" generated from transaction 5, "$50" generated from transaction 6, and "$75" generated from transaction 7. The preliminary response choices may be generated based on transactions 5-7 in combination with other transactions. For example, in order to determine an average dollar amount spent on dinner by the user, the financial quiz application may determine an average of all the dollar amounts of transactions associated with dinners (i.e. the correct answer of the set of response choices), and then may determine other response choices based on ranges within the dollar amounts of transactions. Specifically, if the highest dollar amount spent on a single transaction of the set of transactions is $100, and the lowest dollar amount spent on a single transaction of the set of transactions is $2, then response choices may be generated based on the highest and lowest dollar amounts. Various algorithms may be used to determine the remaining response choices, including determining values that are 75% of the highest dollar amount, and 200% of the lowest dollar amount. Accordingly, a set of response choices based on the preliminary set of response choices (e.g. $25, $50, and $75) may be generated that includes the average of the transactions (i.e. $50), as well as other response choices (e.g. $10 and $30) based on extraction and analysis of the other transaction dollar amounts. Of a set of response choices, only one response choice is the answer (i.e. designated as "correct" based on the user's financial data).

The second question and second set of generated response choices are then added to the quiz (345). As shown in the example in FIG. 3, the question "On average I spend . . . " and the response choices A. "$10", B. "$30", and C. "$50" are added to the quiz. This process may continue until the quiz has been generated with a sufficient number of questions and response choices. In other words, the process of selecting a category, selecting a question based on the category, generating response choices based on the transactions within the selected category, and adding the question and response choices to the quiz may be performed in an iterative fashion until the financial quiz application and/or the user determines that the quiz is complete.

In the example, the quiz is distributed to a social network service (350). The quiz may be distributed through the social network service using the financial quiz application. For example, the user that generated the quiz (e.g. user A) may distribute the quiz to his/her contacts (e.g. users B to Z) within the social network service. Users B to Z may have previously added the financial quiz application in the social network service. Upon distribution of the quiz through the social network service to users B to Z, users B to Z may be able to view the contents of the quiz in their respective financial quiz application instances. Users B to Z may also be able to perform actions in the quiz through the financial quiz application. For instance, if user B fills out the quiz (e.g. completes the quiz, answers the questions of the quiz, selects one answer choice for each question) then user B may be asked to register with and join (e.g. become a member of) the PFMA, and create his/her own quiz. This request may be in the form of a quiz creation invitation that asks the user to join the PFMA by creating a quiz. Mechanisms may be used to incentivize users to fill out the quiz and register with the PFMA, such as offering discounts for products associated with the PFMA, discounts at retailers associated with the PFMA, and the like. Further, upon completing the quiz, the user may receive a score indicating how well the user performed on the quiz. For example, if a user chose every answer correctly, then the user may receive a 100% score. Similarly, if the user incorrectly selected every response choice, then the user may receive a score of 0%.

In one or more embodiments of the invention, upon distribution of the quiz to the social network service, an avatar may be generated and attached to the quiz. An avatar is a graphical depiction associated with the user. The avatar may be a visual representation of the spending habits (e.g. spending predisposition) of the user that created the quiz. For example, if user A spends an amount of money greater than a predefined value (e.g. $500) within a predefined time range (e.g. 1 month) on a predefined category (e.g. dining), then the financial quiz application may generate an avatar that is reflective of the fact that user A spends a significant amount of money on dining. The avatar may be a visual representation of a food connoisseur, a chef, a food critic, and so on. Similarly, if user A spends a certain amount of money (e.g. $1000) on traveling, then the avatar may be a representation of a plane, a foreign language, or another mechanism to portray the user as an avid traveler.

Finally, after the quiz is distributed, the network of users registered with the financial management software expands (355) in the example. This network expands when a user (e.g. user B) registers with the PFMA. Registration may occur after completion of the distributed quiz, or before. By registering, user B gains access to services provided by the PFMA, and may create his/her own quiz based on his/her own financial data. Registration may include submission of information personal to user B, including name, date of birth, address, credit card account data, bank account data, social security number, passport number, drivers license number, and the like. Registration may occur on the PFMA, a webpage associated with the PFMA, through an email, in person, over the phone, and so on.

FIG. 4 shows an example quiz in accordance with one or more embodiments of the invention. The example shown in FIG. 4 is an example only and not intended to limit the scope of the invention.

In example FIG. 4, My Quiz (405) contains various questions and response choices. For instance, question 1. includes the query "My typical Friday afternoon is spent at:" and the response choices "a.) Lunch with friends", "b.) Happy Hour", and "c.) Shopping" (410). As noted underneath the response choices, the question and response choices may be generated based on time and date categories. For example, the question "My typical Friday afternoon is spent at:" may be based on a time and date category (i.e. Friday afternoon). Therefore, the response choices "a.) Lunch with friends", "b.) Happy Hour", and "c.) Shopping" may be based on transactions having timestamps corresponding to Friday afternoons. These transactions may be associated with restaurants, bars, and stores, and therefore the response choices are indicative of activities performed at these locations (e.g. lunch, happy hour, and shopping).

Extra information (e.g. metadata) regarding what categories the question and response choices (i.e. the text surrounded by  ) are based on may be viewed by a user (e.g. user A) that is creating the quiz before distributing the quiz. Users besides user A may not be able to see this metadata. Questions and response choices may be based on various categories, including groceries and dining (415 and 450), payee or vendor name (420, 425, 435, and 440), time (430), and savings, entertainment, and clothing (445). The My Quiz (405) is merely representative of the questions and response choices that may be generated by categories, and that the use of many other questions, response choices, and categories is possible.

The quiz generated using the PFMA and the financial quiz application contains both user and data generated content and draws unique data from a program separate from the social application (i.e. the PFMA). The quiz has a dual purpose in that not only does it provide a way for users to stay in touch with personal finances, but it also acts as a marketing channeling for the PFMA in accordance with one or more embodiments of the invention. Because users cannot create a quiz without an account with the PFMA in accordance with one or more embodiments of the invention, the quiz acts as an incentivizing mechanism for users to sign up with the PFMA.

Figure 5:
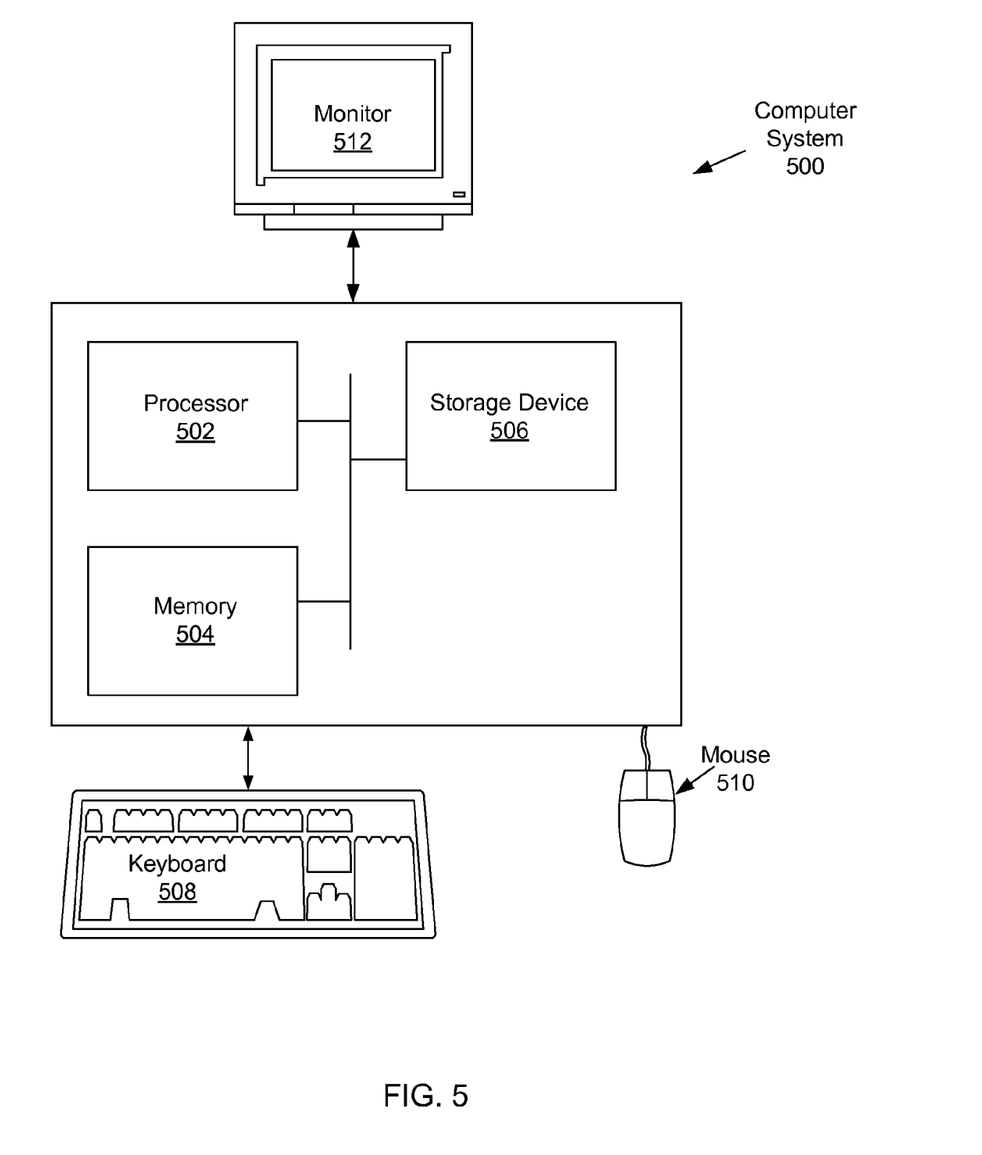
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g. random access memory (RAM), cache memory, flash memory, etc.), a storage device (506) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (502) is hardware. For example, the processor may be an integrated circuit. The computer system (500) may also include input means, such as a keyboard (508), a mouse (510), or a microphone (not shown). Further, the computer system (500) may include output means, such as a monitor (512) (e.g. a liquid crystal display (LCD), a plasma display, or cathode ray tube (CRT) monitor). The computer system (500) may be connected to a network (e.g. a local area network (LAN), a wide area network (WAN) such as the Internet, or any other type of network) via a network interface connection (not shown). Many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g. PFMA, question repository, financial quiz application, social network service, and the like) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a computer readable medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for distributing a multiple choice quiz on a social network service, comprising:
   extracting, from a personal financial management application (PFMA) executing on a processor, a spending history of a user of the PFMA, wherein the spending history comprises a plurality of spending categories defined in the PFMA and a plurality of financial transactions performed by the user;
   receiving, from the user, a first selection of a spending category of the plurality of spending categories defined in the PFMA;
   receiving, from the user, a second selection of a question from a plurality of questions relating to the spending category;
   generating, based on the plurality of financial transactions within the spending category and using the processor, a plurality of response choices comprising an answer to the question;
   adding, to the multiple choice quiz describing a financial behavior of the user, the question and the plurality of response choices comprising the answer to the question, wherein the question is selected by the user; and
   distributing the multiple choice quiz to a plurality of contacts of the user in the social network service.

2. The method of claim 1, further comprising:
   receiving a completed multiple choice quiz from a contact of the plurality of contacts, wherein the completed multiple choice quiz comprises a selected response from the plurality of response choices; and
   receiving a request from the contact to join the PFMA.

3. The method of claim 2, further comprising:
   comparing the selected response to the answer to generate a comparison;
   generating a score for the contact based on the comparison; and
   publishing the score.

4. The method of claim 1, further comprising:
   sending a quiz creation invitation to the plurality of contacts in the social network service to create a new multiple choice quiz, wherein creating the new multiple choice quiz requires registering for an account with the PFMA.

5. The method of claim 1, further comprising:
   determining a search attribute based on the question; and
   selecting a subset of the plurality of financial transactions using the search attribute.

6. The method of claim 5, further comprising:
   calculating a frequency associated with the subset of the plurality of financial transactions, wherein the search attribute is a vendor.

7. The method of claim 5, further comprising:
   calculating an average value for the subset of the plurality of financial transactions, wherein the answer is the average value.

8. The method of claim 5, wherein the search attribute is a range of times, and wherein each transaction in the subset of the plurality of financial transactions comprises a timestamp identifying a time within the range of times.

9. The method of claim 1, further comprising:
   determining a spending predisposition of the user based on the plurality of spending categories and the plurality of financial transactions, wherein the spending predisposition characterizes the spending habits of the user;
   generating an avatar for the user based on the spending predisposition, wherein the avatar is a graphical representation of the spending predisposition; and
   publishing the avatar.

10. A system for distributing a multiple choice quiz on a social network service, comprising:
    a processor;
    a personal financial management application (PFMA) executing on the processor and comprising:
       an application programming interface (API) that allows access to the PFMA; and
       a financial data repository storing a plurality of financial transactions performed by a user;
    a question repository storing a plurality of questions; and
    a financial quiz application configured to:
       extract, from the PFMA using the API, a spending history of the user of the PFMA, wherein the spending history comprises a plurality of spending categories defined in the PFMA and the plurality of financial transactions;
       receive, from the user, a first selection of a spending category of the plurality of spending categories defined in the PFMA;
       receive, from the user, a second selection of a question from the plurality of questions relating to the spending category;
       generate, based on the plurality of financial transactions within the spending category, a plurality of response choices comprising an answer to the question;
       add, to the multiple choice quiz describing a financial behavior of the user, the question and the plurality of response choices comprising the answer to the question, wherein the question is selected by the user; and
       distribute the multiple choice quiz to a plurality of contacts of the user in the social network service.

11. The system of claim 10, wherein the financial quiz application is further configured to:
    receive a completed multiple choice quiz from a contact of the plurality of contacts, wherein the completed multiple choice quiz comprises a selected response from the plurality of response choices; and
    receive a request from the contact to join the PFMA.

12. The system of claim 11, wherein the financial quiz application is further configured to:
    compare the selected response to the answer to generate a comparison;
    generate a score for the contact based on the comparison; and
    publish the score.

13. The system of claim 10, wherein the financial quiz application is further configured to:
    send a quiz creation invitation to the plurality of contacts in the social network service to create a new multiple choice quiz, wherein creating the new multiple choice quiz requires registering for an account with the PFMA.

14. The system of claim 10, wherein the financial quiz application is further configured to:
    determine a search attribute based on the question; and
    select a subset of the plurality of financial transactions using the search attribute.

15. The system of claim 14, wherein the financial quiz application is further configured to:
    calculate a frequency associated with the subset of the plurality of financial transactions, wherein the search attribute is a vendor.

16. The system of claim 10, wherein the financial quiz application is further configured to:
- determine a spending predisposition of the user based on the plurality of spending categories and the plurality of financial transactions, wherein the spending predisposition characterizes the spending habits of the user;
- generate an avatar for the user based on the spending predisposition, wherein the avatar is a graphical representation of the spending predisposition; and
- publish the avatar.

17. A computer readable medium storing instructions to distribute a multiple choice quiz on a social network service, the instructions executable on a processor and comprising functionality to:
- extract, from a personal financial management application (PFMA), a spending history of a user of the PFMA, wherein the spending history comprises a plurality of spending categories defined in the PFMA and a plurality of financial transactions performed by the user;
- receive, from the user, a first selection of a spending category of the plurality of spending categories defined in the PFMA;
- receive, from the user, a second selection of a question from a plurality of questions relating to the spending category;
- generate, based on the plurality of financial transactions within the spending category, a plurality of response choices comprising an answer to the question;
- add, to the multiple choice quiz describing a financial behavior of the user, the question and the plurality of response choices comprising the answer to the question, wherein the question is selected by the user; and
- distribute the multiple choice quiz to a plurality of contacts of the user in the social network service.

18. The computer readable medium of claim 17, the instructions further comprising functionality to:
- receive a completed multiple choice quiz from a contact of the plurality of contacts, wherein the completed multiple choice quiz comprises a selected response from the plurality of response choices; and
- receive a request from the contact to join the PFMA.

19. The computer readable medium of claim 18, the instructions further comprising functionality to:
- compare the selected response to the answer to generate a comparison;
- generate a score for the contact based on the comparison; and
- publish the score.

20. The computer readable medium of claim 17, the instructions further comprising functionality to:
- send a quiz creation invitation to the plurality of contacts in the social network service to create a new multiple choice quiz, wherein creating the new multiple choice quiz requires registering for an account with the PFMA.

21. The computer readable medium of claim 17, the instructions further comprising functionality to:
- determine a search attribute based on the question; and
- select a subset of the plurality of financial transactions using the search attribute.

22. The computer readable medium of claim 21, the instructions further comprising functionality to:
- calculate a frequency associated with the subset of the plurality of financial transactions, wherein the search attribute is a vendor.

23. The computer readable medium of claim 21, the instructions further comprising functionality to:
- calculate an average value for the subset of the plurality of financial transactions, wherein the answer is the average value.

24. The computer readable medium of claim 21, wherein the search attribute is a range of times, and wherein each transaction in the subset of the plurality of financial transactions comprises a timestamp identifying a time within the range of times.

25. The computer readable medium of claim 17, the instructions further comprising functionality to:
- determine a spending predisposition of the user based on the plurality of spending categories and the plurality of financial transactions, wherein the spending predisposition characterizes the spending habits of the user;
- generate an avatar for the user based on the spending predisposition, wherein the avatar is a graphical representation of the spending predisposition; and
- publish the avatar.

* * * * *